US010990892B2

(12) United States Patent
Dukatz et al.

(10) Patent No.: US 10,990,892 B2
(45) Date of Patent: *Apr. 27, 2021

(54) QUANTUM COMPUTING IMPROVEMENTS TO TRANSPORTATION

(71) Applicant: Accenture Global Solutions Limited, Dublin (IE)

(72) Inventors: Carl Matthew Dukatz, Troy, MI (US); Sonali Parthasarathy, Mountain View, CA (US); Srinivas Yelisetty, Fremont, CA (US); Lascelles Forrester, Conyers, GA (US)

(73) Assignee: Accenture Global Solutions Limited, Dublin (IE)

( * ) Notice: Subject to any disclaimer, the term of this patent is extended or adjusted under 35 U.S.C. 154(b) by 45 days.

This patent is subject to a terminal disclaimer.

(21) Appl. No.: 16/459,762

(22) Filed: Jul. 2, 2019

(65) Prior Publication Data

US 2019/0325338 A1 Oct. 24, 2019

Related U.S. Application Data

(63) Continuation of application No. 15/466,249, filed on Mar. 22, 2017, now Pat. No. 10,387,791.

(51) Int. Cl.
*G06N 10/00* (2019.01)
*G06Q 10/04* (2012.01)
(Continued)

(52) U.S. Cl.
CPC ............. *G06N 10/00* (2019.01); *G06N 5/003* (2013.01); *G06Q 10/047* (2013.01); *G06Q 50/30* (2013.01); *G08G 5/0021* (2013.01)

(58) Field of Classification Search
CPC .... G08G 5/003; B64C 39/024; B64C 2201/14
(Continued)

(56) References Cited

U.S. PATENT DOCUMENTS 6,882,992 B1 * 4/2005 Werbos ................ G05B 13/027
706/48
8,035,540 B2 * 10/2011 Berkley ................ G06N 10/00
341/133

(Continued)

FOREIGN PATENT DOCUMENTS

EP 3136308 7/2016

OTHER PUBLICATIONS

U.S. Appl. No. 15/466,249, filed Sep. 27, 2018, Dukatz et al.
(Continued)

*Primary Examiner* — Peter D Nolan
*Assistant Examiner* — Wae L Louie
(74) *Attorney, Agent, or Firm* — Fish & Richardson P.C.

(57) ABSTRACT

Methods and systems for a quantum computing approach to solving challenging, e.g., NP-complete, problems in transportation. One of the methods includes (a) ingesting transportation-related data into a graph structure, the transportation-related data being associated with a transportation system; (b) identifying a transportation metric associated with the transportation system; (c) identifying at least one attribute associated with the transportation-related data, where the transportation metric is based at least in part on the attribute; (d) using a quantum computer to derive an operational parameter for the attribute that improves the transportation metric; and (e) applying the operational parameter to the operation of the transportation system.

17 Claims, 5 Drawing Sheets

(51) Int. Cl.
*G06Q 50/30* (2012.01)
*G08G 5/00* (2006.01)
*G06N 5/00* (2006.01)

(58) Field of Classification Search
USPC .......................................................... 701/120
See application file for complete search history.

(56) References Cited

U.S. PATENT DOCUMENTS

| | | | | |
|---|---|---|---|---|
| 9,311,600 | B1* | 4/2016 | Ring | G06N 5/043 |
| 10,387,791 | B2* | 8/2019 | Dukatz | G06N 5/003 |
| 2006/0225165 | A1* | 10/2006 | Maassen van den Brink | G06F 15/80 |
| | | | | 257/9 |
| 2006/0282236 | A1* | 12/2006 | Wistmuller | G06K 9/6251 |
| | | | | 703/2 |
| 2011/0060710 | A1* | 3/2011 | Amin | G06F 15/16 |
| | | | | 706/13 |
| 2013/0144832 | A1* | 6/2013 | Li | G06N 7/00 |
| | | | | 706/57 |
| 2014/0070895 | A1* | 3/2014 | Chindo | H03B 17/00 |
| | | | | 331/94.1 |
| 2014/0274056 | A1* | 9/2014 | Hyde | H04W 48/18 |
| | | | | 455/436 |
| 2014/0297247 | A1* | 10/2014 | Troyer | G06F 30/20 |
| | | | | 703/21 |
| 2015/0026158 | A1* | 1/2015 | Jin | G06F 16/90335 |
| | | | | 707/722 |
| 2015/0203213 | A1* | 7/2015 | Levien | H04L 63/14 |
| | | | | 701/486 |
| 2015/0310350 | A1 | 10/2015 | Niskanen et al. | |
| 2015/0370251 | A1* | 12/2015 | Siegel | G05D 1/00 |
| | | | | 701/2 |
| 2016/0101665 | A1* | 4/2016 | Followell | B64D 13/06 |
| | | | | 95/25 |
| 2016/0144278 | A1* | 5/2016 | el Kaliouby | G07F 17/3206 |
| | | | | 463/36 |
| 2016/0264234 | A1† | 9/2016 | Vaughn et al. | |
| 2018/0053136 | A1* | 2/2018 | DaCosta | G06Q 10/063112 |
| 2018/0070527 | A1* | 3/2018 | Richt | A01B 79/005 |
| 2018/0075545 | A1* | 3/2018 | Richt | G06Q 10/063 |
| 2018/0183860 | A1* | 6/2018 | Majumdar | H04L 67/1002 |
| 2018/0276994 | A1* | 9/2018 | Dukatz | G08G 5/0021 |
| 2019/0325338 | A1* | 10/2019 | Dukatz | G06N 10/00 |

OTHER PUBLICATIONS

'1qbit.com' [online]. "1Qbit," May 22, 2016, [Retrieved on Aug. 25, 2017]. Retrieved from the Internet: URL < http://1qbit.com/about/ >, 5 pages.

'arxiv.org' [online]. "Quantum Computation by Adiabatic Evolution," Jan. 28, 2000, [Retrieved on Aug. 25, 2017]. Retrieved from the Internet: URL < https://axiv.org/abs/quant-ph/0001106 >, 24 pages.

'arxiv.org' [online]. "Traffic flow optimization using a quantum annealer," Aug. 4, 2017, [Retrieved on Aug. 25, 2017]. Retrieved from the Internet: URL < http://arxiv.org/abs/1708.01625 > 12 pages.

'newatlas.com' [online]. "D-Wave quantum computer matches the tenth ranked supercomputer for speed," May 13, 2013, [Retrieved on Aug. 25, 2017]. Retrieved from the Internet: URL < http://newatlas.com/d-wave-quantum-computer-supercomputer-ranking/27476/ > 8 pages.

AU Examination Report in Australian Application No. 2018201947, dated Sep. 13, 2018, 9 pages.

AU Examination Report in Australian Application No. 2018201947, dated Feb. 11, 2019, 4 pages.

AU Examination Report in Australian Application No. 2018201947, dated Apr. 27, 2018, 7 pages.

Bast et al., "Route Planning in Transportation Networks," University of Freiburg, Dated Apr. 17, 2015, 65 pages.

Kadowaki, "Study of Optimization Problems by Quantum Annealing," Tokyo Institute of Technology, Department of Physics, Dec. 1998, 99 pages.

\* cited by examiner
† cited by third party

QUANTUM COMPUTING IMPROVEMENTS TO TRANSPORTATION

CROSS-REFERENCE TO RELATED APPLICATIONS

This application is a continuation of and claims priority to U.S. application Ser. No. 15/466,249, filed Mar. 22, 2017, now allowed. The contents of the prior application are incorporated by reference herein in their entirety.

BACKGROUND

Technical Field

This specification relates to the field of quantum computing and the field of transportation.

Background

Transportation of people and things plays a critical role in modern society. As populations increase and as standards of living get better, demand for improved transportation of people and things continues to increase. Some problems in the transportation arena, for example nondeterministic polynomial time (NP) complete problems, are not solvable in a timely manner using classical computers. For NP complete problems, the time required to solve the problem using a known approach on a classical computer increases very quickly as the size of the problem (as the number of potential solutions) grows. Thus, there is a need for a greater variety of techniques for addressing such problems in the transportation arena.

SUMMARY

This specification describes technologies for a quantum computing approach to solving challenging, e.g., NP-complete, problems in transportation. In general, one innovative aspect of the subject matter described in this specification can be embodied in methods that include the actions of (a) ingesting transportation-related data into a graph structure, the transportation-related data being associated with a transportation system; (b) identifying a transportation metric associated with the transportation system; (c) identifying at least one attribute associated with the transportation-related data, where the transportation metric is based at least in part on the attribute; (d) using a quantum computer to derive an operational parameter for the attribute that improves the transportation metric; and (e) applying the operational parameter to the operation of the transportation system.

Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. In particular, one embodiment includes all the following features in combination. The method can further include receiving a problem at least a portion of which is NP complete and determining which portion of the problem to process using steps (a)-(e) described above and which portion of the problem to process using a classical computer. The transportation-related data can be flight-related data, the transportation system can be a flight system, and the transportation metric can be a flight-related metric. The method can further include: (i) measuring the results of applying the operational parameter to the operation of the flight system; (ii) identifying an additional attribute associated with the flight data where the flight metric is also based at least in part on the additional attribute; and (iii) using a quantum computer to derive an operational parameter for the additional attribute that improves the flight-related metric. The method can include using an operational parameter that improves the flight metric for a first drone to improve the flight metric for a second drone.

Identifying at least one attribute associated with the flight-related data can further include identifying at least one constraint associated with the flight-related data. The method can further include identifying a plurality of attributes, the flight metric can be energy consumption, the flight system can include at least one drone and the attributes can include weight of the drone and weight of a package carried by the drone. The method can further include defining a data model prior to ingesting the flight-related data into a graph structure, the graph structure being based at least in part on the data model.

The subject matter described in this specification can be implemented in particular embodiments so as to realize one or more of the following advantages. As noted above, populations are increasing. Standards of living are also get better. As a consequence, demand for improved transportation of people and things continues to increase. Interestingly, some problems in the transportation arena, for example NP-complete problems, are not solvable in a timely manner using classical computers. Embodiments described in this specification use quantum computing to solve transportation related optimization problems in a manner that is advantageous, e.g., faster or less expensive, than doing so using only classical computing approaches. Thus, the many advantages include energy, time and cost savings associated with better functioning transportation systems.

The details of one or more embodiments of the subject matter of this specification are set forth in the accompanying drawings and the description below. Other features, aspects, and advantages of the subject matter will become apparent from the description, the drawings, and the claims.

DETAILED DESCRIPTION

Figure 1:
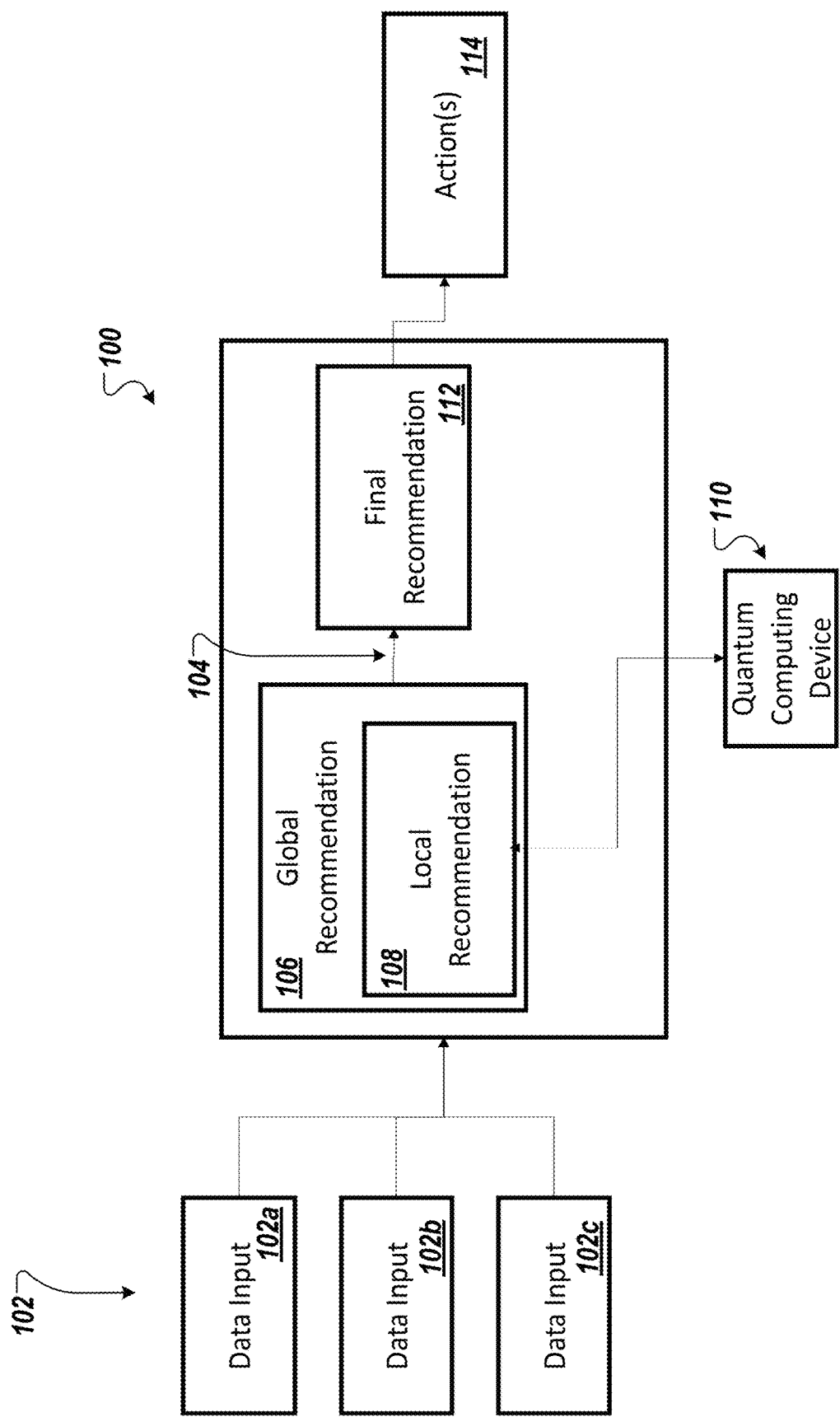
FIG. 1 is an exemplary quantum computing engine for transportation optimization such as flight optimization.

This specification describes technologies for a quantum computing approach to solving a challenging, e.g., a NP-complete, problem in a transportation system. FIG. 1 shows an example quantum computing engine 100. The engine receives various data inputs, e.g., data inputs 102a, 102b, and 102c. The incoming data represents an optimization task to be solved. For example, the optimization task may be to minimize the energy consumption for a drone tasked with carrying a package.

Given an optimization task, one can develop a data model associated with the optimization task. The data model specifies which data is relevant to the optimization problem, e.g., which attributes impact energy consumption. For example, the data model may include attributes such as battery usage of the drone under various conditions (including the battery consumption of various on-board apps), GPS data for the drone's potential route(s), wind speed and direction at various points along the drone's potential path and the package's weight. As a result, the data inputs would include data on such specified attributes.

Thus the system receives input data specifying an optimization task to be solved. In certain embodiments, a first set of calls to computing resources (including at least one quantum computing device) obtains a set of initial local solutions to the optimization task, e.g., locally optimal solutions. Based on the set of initial local solutions, a second call to the computing resources, in particular to a quantum annealer, obtains a solution to the optimization task, e.g., a globally optimal solution.

In some cases, an obtained solution may be compared to global task objectives, e.g., global targets, for the optimization task. If the obtained solution sufficiently satisfies the global task objectives, corresponding initial solutions may be used to determine one or more actions to be taken, e.g., adjustments to optimization task parameters. If the obtained solution does not sufficiently satisfy the global task objectives, the system may iteratively repeat the process of obtaining a solution to the optimization task based on modified input data until a solution that sufficiently satisfies the global task objectives is obtained.

In some implementations, the input data 102 may further include data specifying one or more task objectives associated with the optimization task. The task objectives may include local task objectives and global task objectives. Local task objectives may include local targets to be considered when solving the optimization task, e.g., local objectives of a solution to the optimization task. For example, local objectives may include constraints on values of subsets of optimization task variables, e.g., the package may need to get to a waypoint by a certain time. Global task objectives may include global targets to be considered when solving the optimization task, e.g., global objectives of a solution to the optimization task such as a battery life constraint for a drone battery.

The quantum computing engine 100 is configured to process the received input data 102 to generate actions 114. As shown in FIG. 1, one embodiment of the quantum computing engine comprises a global recommendation engine 106 that includes a local recommendation engine 108. The local recommendation engine 108 is configured to process the received data to obtain one or more initial solutions to the optimization task based on the one or more local task objectives, e.g., one or more local solutions to the optimization task. The global/local recommendation engine communicates with quantum computing device 110 and provides one or more global recommendation to the final recommendation engine 112. Final recommendation engine 112 then provides recommended actions 114, such as adjusting the path of a drone based on wind conditions to preserve the drone's battery life.

The global recommendation engine can first derive local recommendations using the local recommendation engine 108. In some implementations, the generated output data may include data representing a global solution to the optimization task specified by the input data 102, e.g., a global solution to the optimization task based on one or more global task objectives. Processing received input data representing an optimization task to be solved and one or more objectives for solving the optimization task to generate output data representing a global solution to the optimization task is described in more detail below with reference to FIG. 2.

In other implementations or in addition, the output data from the global recommendation engine 106 may include data representing one or more local solutions to the optimization task, e.g., one or more initial solutions to the optimization task that are based on local task objectives. Local solutions to the optimization task may include solutions to sub-tasks of the optimization task. For example, local solutions may include solutions that are optimal over a subset of the parameters associated with the optimization task, e.g., where the subset is specified by the local task objectives. As another example, in cases where the optimization task is a separable task, e.g., a task that may be written as the sum of multiple sub-tasks, local solutions may include optimal solutions to each of the sub-tasks in the sum of sub-tasks, e.g., where the sub-tasks are specified by the local task objectives.

Figure 2:
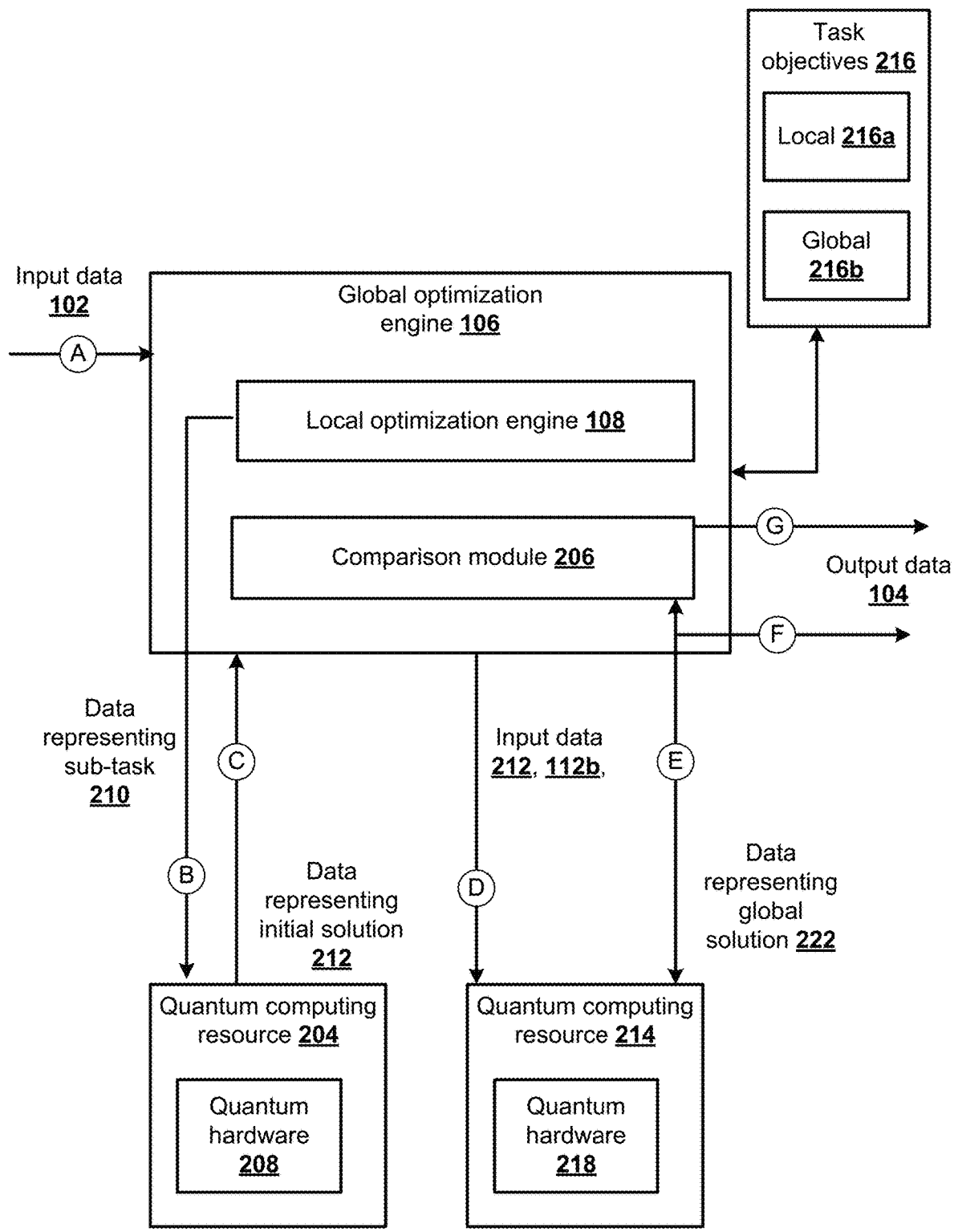
FIG. 2 is a schematic of one embodiment of the quantum computing engine of FIG. 1.

FIG. 2 depicts an example global recommendation engine 106, as introduced above with reference to FIG. 1. The example global recommendation engine 106 includes a local recommendation engine 108 and a comparison module 206. As described above with reference to FIG. 1, the global recommendation engine 106 is in communication with at least one or more additional computing resources, e.g., quantum computing resource 204, and a database storing one or more task objectives, e.g., data store 216.

During operation (A), the global recommendation engine 106 is configured to receive input data 102 specifying an optimization task to be solved, together with data representing one or more properties of the optimization task and parameters of the optimization task, as described above with reference to FIG. 1. The input data may include static data and dynamic data. In some implementations the global recommendation engine 106 may be configured to receive the input data 102 directly, e.g., in a form in which the input data 102 was provided to the quantum computing engine 100 as described above with reference to FIG. 1. In other implementations the global recommendation engine 106 may be configured to receive the input data 102 from another component of the quantum computing engine 100.

The global recommendation engine 106 is configured to provide the received input data 102 to the local recommendation engine 108. The local recommendation engine 108 is configured to process the input data 102 to obtain one or more initial solutions to the optimization task based on local task objectives 216a included in the task objectives data store 216. As described above with reference to FIG. 1, initial solutions to the optimization task may include solutions to sub-tasks of the optimization task. For example, initial solutions may include solutions that are optimal over a subset of parameters associated with the optimization task, or, in cases where the optimization task is a separable task that may be written as a sum of sub-tasks, solutions to the sub-tasks.

In some implementations, the local recommendation engine 108 may be configured to process the input data 102 to obtain one or more initial solutions to the optimization task by partitioning the optimization task into one or more sub-tasks. For example, as described above with reference to FIG. 1, the local recommendation engine 108 may be in communication with a subgraph component of the quantum computing engine 100, and may be configured to provide the subgraph component with data representing the optimization task, and to receive data representing multiple minimally connected sub graphs representing sub-tasks of the optimization problem. For each sub-task, the local recommendation engine 108 may be further configured to identify local task objectives from the task objective data store 216 that are relevant to the sub-task. The local recommendation engine 108 may then be configured to route data representing each sub-task with its respective identified local task objectives to respective computing resources included in the system.

At least one of the obtained one or more initial solutions may be obtained from a quantum computing resource, e.g., quantum computing resource 204. For example, the local recommendation engine 108 may be configured to provide data specifying the optimization task and one or more local task objectives 216a to a quantum annealer.

To solve an optimization task using a quantum annealer, e.g., quantum computing resource 204, quantum hardware 208 included in the quantum annealer may be constructed and programmed to encode a solution to the optimization task into an energy spectrum of a many-body quantum Hamiltonian H_p that characterizes the quantum hardware 208. For example, the solution maybe encoded in the ground state of the Hamiltonian H_p. The quantum hardware 208 may be configured to perform adiabatic quantum computation starting with an easy to prepare, known ground state of a known initial Hamiltonian H_i. Over time, as the known initial Hamiltonian H_i evolves into the Hamiltonian for solving the problem H_p, the known ground state evolves and remains in the instantaneous ground state of the evolving Hamiltonian. The ground state of the Hamiltonian H_p is obtained at the end of the evolution. The solution to the optimization task may then be readout by measuring the quantum hardware 208.

During operation (B), the local recommendation engine 108 may be configured to provide the quantum annealer with data representing a sub-task 210 of the optimization task. In some implementations the local recommendation engine 108 may be configured to communicate with the quantum computing resource 204 to determine physical interactions that are available within the quantum hardware 208 in order to map the sub-task to a suitable Hamiltonian H_p that may be implemented by the quantum hardware 208 of the quantum computing resource 204. The local recommendation engine 108 may then be configured to provide the quantum computing resource 204 with data representing the Hamiltonian Hp. In other implementations, the quantum computing resource 204 may include one or more components that are configured to receive data representing a sub-task and one or more sub-task objectives, and to encode the received data into a suitable Hamiltonian that may be implemented by the quantum hardware 208, e.g., using a quantum compiler.

During operation (C), the global recommendation engine 106 is configured to receive data representing the initial solution to the sub-task from the quantum computing resource 204.

To generate a global solution to the optimization task, during operation (D) the global recommendation engine 106 is configured to provide data representing the one or more initial solutions, e.g., including data representing initial solution 212, and data representing the optimization task to be solved to a second quantum computing resource 214, e.g., a second quantum annealer. In some implementations, the global recommendation engine 106 may be configured to provide additional data to the second quantum computing resource 214, including data representing global task objectives 216b. In certain embodiments the quantum computing resource 204 and quantum computing resource 214 are the same resource.

The second quantum computing resource 214 may be configured to receive the data representing the one or more initial solutions 212, optimization task to be solved, and additional data 216b, or to receive data representing a suitable Hamiltonian H_p and to perform a quantum annealing operation based on the received data in order to determine a global solution to the optimization task. In other implementations, the quantum computing resource 214 may include one or more components that are configured to receive data representing a sub-task and one or more sub-task objectives, and to encode the received data into a suitable Hamiltonian that may be implemented by the quantum hardware 218, e.g., using a quantum compiler.

During operation (E), the global recommendation engine 106 is configured to receive data representing a global solution to the optimization task 222 from the second quantum computing resource 214. In some implementations, during operation (F), the global recommendation engine 106 may be configured to directly provide the data representing the global solution to the optimization task as output, e.g., as output data 104. In other implementations, the global recommendation engine 106 may be configured to provide the comparison module 206 with the data representing the global solution to the optimization task 222.

The comparison module 206 is configured to compare the data representing the generated global solution to the optimization task 222 with data representing the global task objectives 216b to determine whether the generated global solution 222 sufficiently satisfies the global task objectives 216b. For example, the comparison module 206 may be configured to apply a comparison function to the data representing the generated global solution 222 and the data representing the global task objectives 216b to generate a comparison score. The comparison module 206 may then be configured to compare the comparison score to a predetermined score threshold to determine whether the generated global solution 222 sufficiently satisfies the global task objectives 216b.

During operation (G), if the comparison module 206 determines that the generated global solution 222 sufficiently satisfies the global task objectives 216b, the comparison module may be configured to provide as output 104 data representing the global solution 222 and, optionally data representing the one or more initial solutions as obtained by the local recommendation engine 108, e.g., data including data representing initial solution 212.

Figure 3:
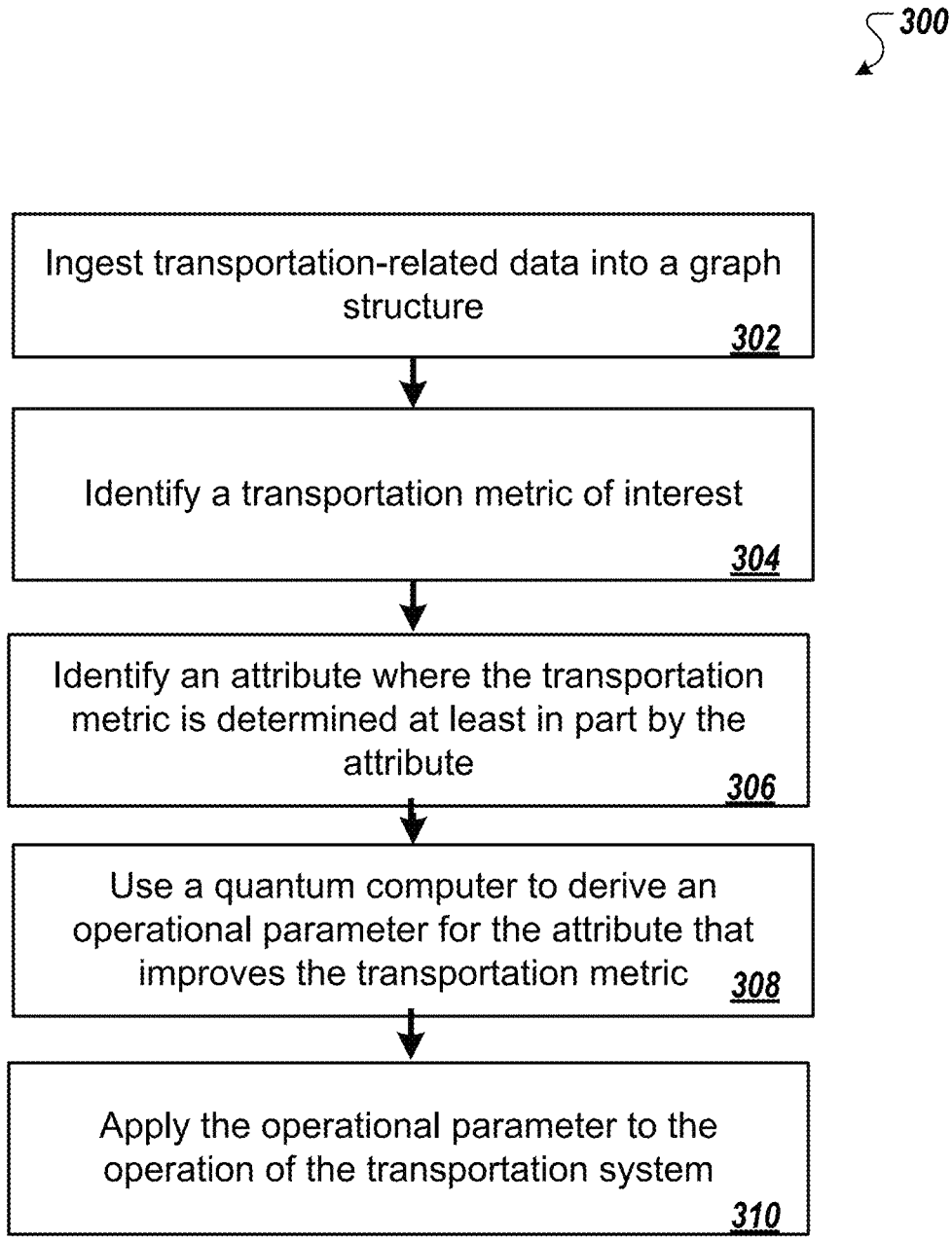
FIG. 3 is a flow chart of an exemplary method for improving the operation of a transportation system.

FIG. 3 is a flowchart of an example process 300 for using a quantum computing approach to solve a challenging, e.g., a NP-complete, problem in a transportation system. For convenience, the method 300 will be described as being performed by a system of one or more computers, located in one or more locations, and programmed appropriately in accordance with this specification. For example, a quantum computing system, e.g., the quantum computing engine 100 of FIG. 1, appropriately programmed, can perform the method 300.

With reference to FIG. 3, the method ingests 302 transportation-related data into a graph structure. In certain contexts, there are pre-existing tools for ingesting date into a graph structure. For example, there are open source tools such as RDkit.org that ingest chemical data into a graph structure. Similar tools exist or can be created for transportation-related data.

The method identifies 304 a transportation metric of interest, e.g., energy consumption. and identifies 306 one or more attributes where the transportation metric is determined at least in part by the attribute. In the case where the transportation system is a drone carrying a package and the metric is energy consumption, attributes that affect the drone's energy consumption can include wind speeds along the drone's potential path, the energy consumption of on-board applications and the weight of the package. The method uses 308 a quantum computer to derive an operational parameter for the attribute that improves the transportation metric and the method applies 310 the operational parameter to the operation of the transportation system.

Figure 4:
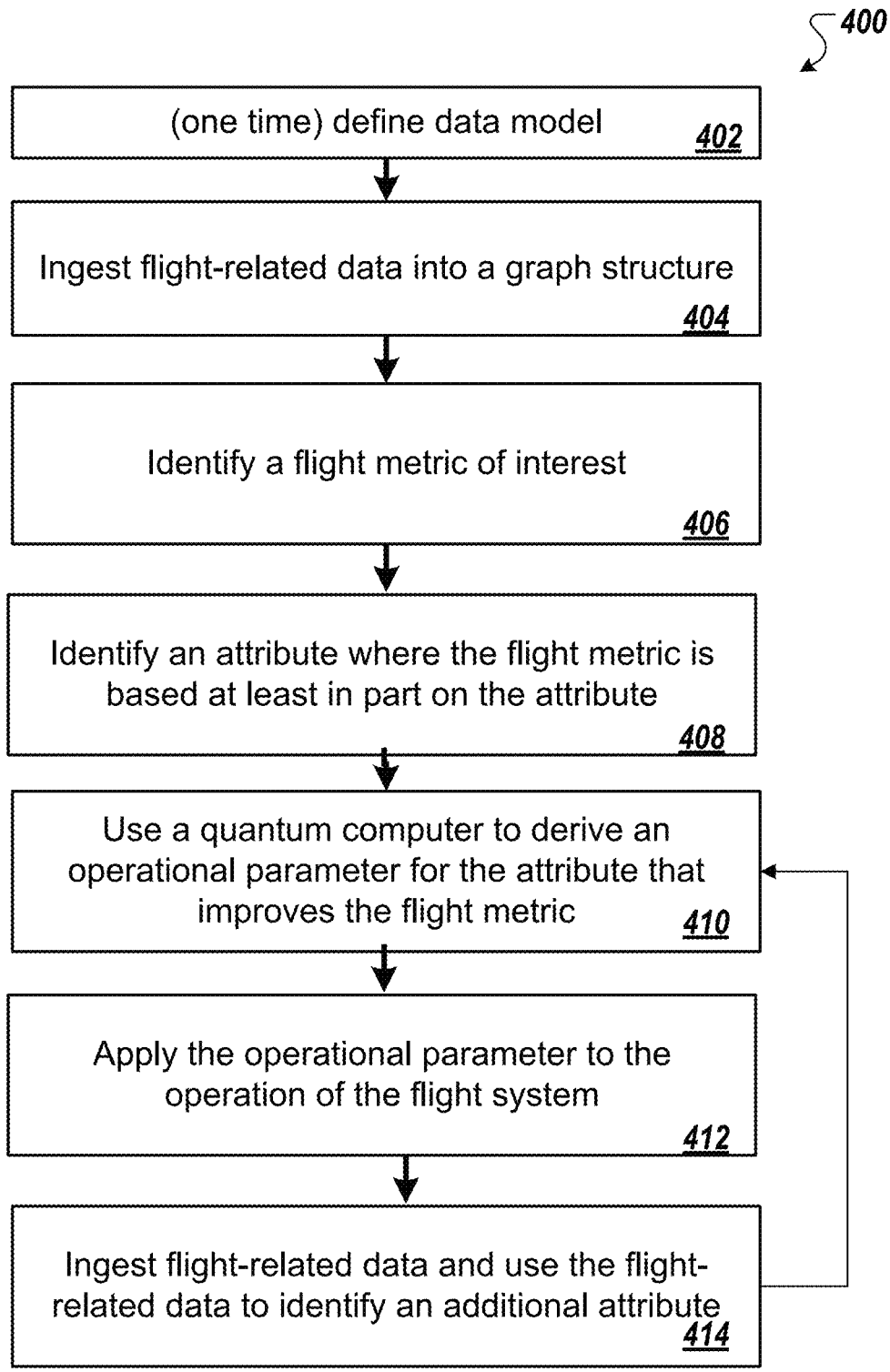
FIG. 4 is a flow chart of another exemplary method for improving the operation of a transportation system, in this case a flight system.

FIG. 4 is a flow chart of another exemplary method for improving the operation of a transportation system, in this case a flight system. The method includes: defining 402 a data model, e.g., defining the attributes relevant to the metric of interest (defining a data model is typically only required the first time and thus is an optional step, e.g., if the data model is already defined); ingesting 404 flight-related data into a graph structure; identifying 406 a flight metric of interest; identifying 408 at least one attribute where the flight metric is based at least in part on the attribute; using 410 a quantum computer to derive an operational parameter for the attribute that improves the flight metric; applying 412 the operational parameter to the operation of the flight system; ingesting 414 more flight-related data and using the ingested flight-related data to identify an additional attribute; and finally feeding the additional attribute along with the pre-existing attribute(s) into the quantum computer to derive an operational parameter for the attributes to improve the flight metric.

Figure 5:
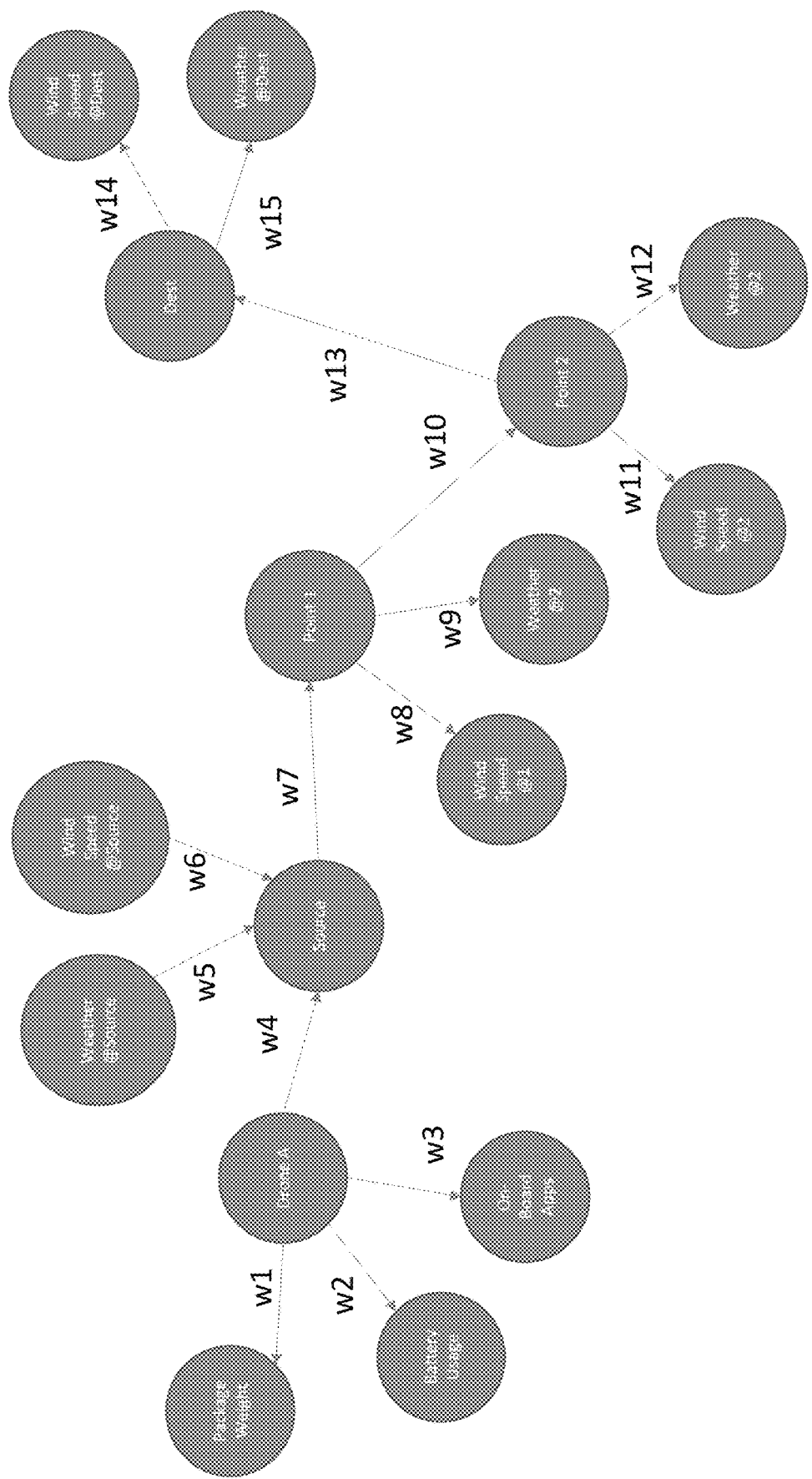
FIG. 5 is an exemplary graph structure for a flight system involving a drone.

FIG. 5 is an exemplary graph structure for a flight system involving a drone carrying a package. The graph can be used to improve a metric of interest for a single drone as shown or it could be used to improve a metric of interest for a fleet of drones. The graph shows attributes for the drone such as battery usage, energy consumption of on-board applications and the weight of the package to be carried by the drone. The graph also shows attributes for the drone's source, destination and waypoints (e.g., points 1 and 2). The attributes for locations can include for example wind-speed and direction. An optimization task can be to develop a path that meets a specified constraint. The path could be determined from either a time or a cost perspective. The edges between the various elements in the graph have weights that can reflect the cost associated with the attribute. The cost could be for example, an energy cost, a financial cost, a time or a distance. If the optimization task is to minimize energy consumption, using lots of energy consuming on-board applications has a certain cost in terms of remaining energy available to the drone to get to points 1 and 2 with a package of a certain weight.

Problems that can be addressed using the systems and methods described in this specification include knapsack type problems, travelling salesman type problem (TSP) and graph similarity type problems. One can formulate the flight-related data and associated attributes and constraints into the framework of the well-known knapsack problem and apply the above-referenced method to improve a flight metric using the knapsack problem framework. In such a case, the drone is analogous to the knapsack having a weight constraint and the packages are the items having various weights and values.

Similarly, for TSP, instead of optimizing for shortest length one could reduce energy consumption and instead of using as inputs the number of cities and distances between the cities, one could use as inputs: battery usage of the drone, the weather data at that time at specific locations along the route, wind speeds at specific locations on the route, package weight information, and battery usage of the on-board applications. Quantum computing consulting companies such as 1 Qbit produce development kits, online platforms, and applications that facilitate using quantum computers to solve problems, such as the knapsack problem or TSP, well suited to quantum computation. Thus one can use the well-known knapsack or TSP problem formulations and their quantum counterparts to apply quantum computing to help solve such problems in the transportation arena in a more advantageous way compared to using only classical computing approaches.

There is also an algorithm called Graph Similarity that finds the common substructures in two graphs and provides a similarity measure based on these substructures. One can use a method called "conflict graph" that is built using the two routes/graphs one wants to compare. In this method, one can ingest data at time t into one graph. Over time one ingests data to form other graphs. One eventually develops graphs for multiple routes based on the constraints (e.g., battery, wind, weight of packets, and distance). One can then use the graph similarity to compare these routes/plans.

The above-described methods can be expanded to a fleet of drones (drone management) where an exemplary method would use a quantum computer or improve the operation of the fleet, e.g., to calculate recommended routes for a plurality of drones in the fleet or to improve the operation of a second drone based on data observed regarding the operation of a first drone.

Implementations of the digital and/or quantum subject matter and the digital functional operations and quantum operations described in this specification can be implemented in digital electronic circuitry, suitable quantum circuitry or, more generally, quantum computational systems, in tangibly-embodied digital and/or quantum computer software or firmware, in digital and/or quantum computer hardware, including the structures disclosed in this specification and their structural equivalents, or in combinations of one or more of them. The term "quantum computational systems" may include, but is not limited to, quantum computers, quantum information processing systems, quantum cryptography systems, or quantum simulators.

Implementations of the digital and/or quantum subject matter described in this specification can be implemented as one or more digital and/or quantum computer programs, i.e., one or more modules of digital and/or quantum computer program instructions encoded on a tangible non-transitory storage medium for execution by, or to control the operation of, data processing apparatus. The digital and/or quantum computer storage medium can be a machine-readable storage device, a machine-readable storage substrate, a random or serial access memory device, one or more qubits, or a combination of one or more of them. Alternatively or in addition, the program instructions can be encoded on an artificially-generated propagated signal that is capable of encoding digital and/or quantum information, e.g., a machine-generated electrical, optical, or electromagnetic signal, that is generated to encode digital and/or quantum information for transmission to suitable receiver apparatus for execution by a data processing apparatus.

The terms quantum information and quantum data refer to information or data that is carried by, held or stored in quantum systems, where the smallest non-trivial system is a qubit, i.e., a system that defines the unit of quantum information. It is understood that the term "qubit" encompasses all quantum systems that may be suitably approximated as a two-level system in the corresponding context. Such quantum systems may include multi-level systems, e.g., with two or more levels. By way of example, such systems can include atoms, electrons, photons, ions or superconducting qubits. In many implementations the computational basis states are identified with the ground and first excited states, however it is understood that other setups where the computational states are identified with higher level excited states are possible. The term "data processing apparatus" refers to digital and/or quantum data processing hardware and encompasses all kinds of apparatus, devices, and machines for processing digital and/or quantum data, including by way of example a programmable digital processor, a programmable quantum processor, a digital computer, a quantum computer, multiple digital and quantum processors or computers, and combinations thereof. The apparatus can also be, or further include, special purpose logic circuitry, e.g., an FPGA (field programmable gate array), an ASIC (application-specific integrated circuit), or a quantum simulator, i.e., a quantum data processing apparatus that is designed to simulate or produce information about a specific quantum system. In particular, a quantum simulator is a special purpose quantum computer that does not have the capability to perform universal quantum computation. The apparatus can optionally include, in addition to hardware, code that creates an execution environment for digital and/or quantum computer programs, e.g., code that constitutes processor firmware, a protocol stack, a database management system, an operating system, or a combination of one or more of them.

A digital computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a digital computing environment. A quantum computer program, which may also be referred to or described as a program, software, a software application, a module, a software module, a script, or code, can be written in any form of programming language, including compiled or interpreted languages, or declarative or procedural languages, and translated into a suitable quantum programming language, or can be written in a quantum programming language, e.g., QCL or Quipper.

A digital and/or quantum computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A digital and/or quantum computer program can be deployed to be executed on one digital or one quantum computer or on multiple digital and/or quantum computers that are located at one site or distributed across multiple sites and interconnected by a digital and/or quantum data communication network. A quantum data communication network is understood to be a network that may transmit quantum data using quantum systems, e.g. qubits. Generally, a digital data communication network cannot transmit quantum data, however a quantum data communication network may transmit both quantum data and digital data.

The processes and logic flows described in this specification can be performed by one or more programmable digital and/or quantum computers, operating with one or more digital and/or quantum processors, as appropriate, executing one or more digital and/or quantum computer programs to perform functions by operating on input digital and quantum data and generating output. The processes and logic flows can also be performed by, and apparatus can also be implemented as, special purpose logic circuitry, e.g., an FPGA or an ASIC, or a quantum simulator, or by a combination of special purpose logic circuitry or quantum simulators and one or more programmed digital and/or quantum computers.

For a system of one or more digital and/or quantum computers to be "configured to" perform particular operations or actions means that the system has installed on it software, firmware, hardware, or a combination of them that in operation cause the system to perform the operations or actions. For one or more digital and/or quantum computer programs to be configured to perform particular operations or actions means that the one or more programs include instructions that, when executed by digital and/or quantum data processing apparatus, cause the apparatus to perform the operations or actions. A quantum computer may receive instructions from a digital computer that, when executed by the quantum computing apparatus, cause the apparatus to perform the operations or actions.

Digital and/or quantum computers suitable for the execution of a digital and/or quantum computer program can be based on general or special purpose digital and/or quantum processors or both, or any other kind of central digital and/or quantum processing unit. Generally, a central digital and/or quantum processing unit will receive instructions and digital and/or quantum data from a read-only memory, a random access memory, or quantum systems suitable for transmitting quantum data, e.g. photons, or combinations thereof.

The essential elements of a digital and/or quantum computer are a central processing unit for performing or executing instructions and one or more memory devices for storing instructions and digital and/or quantum data. The central processing unit and the memory can be supplemented by, or incorporated in, special purpose logic circuitry or quantum simulators. Generally, a digital and/or quantum computer will also include, or be operatively coupled to receive digital and/or quantum data from or transfer digital and/or quantum data to, or both, one or more mass storage devices for storing digital and/or quantum data, e.g., magnetic, magneto-optical disks, optical disks, or quantum systems suitable for storing quantum information. However, a digital and/or quantum computer need not have such devices.

Digital and/or quantum computer-readable media suitable for storing digital and/or quantum computer program instructions and digital and/or quantum data include all forms of non-volatile digital and/or quantum memory, media and memory devices, including by way of example semiconductor memory devices, e.g., EPROM, EEPROM, and flash memory devices; magnetic disks, e.g., internal hard disks or removable disks; magneto-optical disks; CD-ROM and DVD-ROM disks; and quantum systems, e.g., trapped atoms or electrons. It is understood that quantum memories are devices that can store quantum data for a long time with high fidelity and efficiency, e.g., light-matter interfaces where light is used for transmission and matter for storing and preserving the quantum features of quantum data such as superposition or quantum coherence.

Control of the various systems described in this specification, or portions of them, can be implemented in a digital and/or quantum computer program product that includes instructions that are stored on one or more non-transitory machine-readable storage media, and that are executable on one or more digital and/or quantum processing devices. The systems described in this specification, or portions of them, can each be implemented as an apparatus, method, or system that may include one or more digital and/or quantum processing devices and memory to store executable instructions to perform the operations described in this specification.

While this specification contains many specific implementation details, these should not be construed as limitations on the scope of what may be claimed, but rather as descriptions of features that may be specific to particular implementations. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the implementations described above should not be understood as requiring such separation in all implementations, and it should be understood that the described program components and systems can generally be integrated together in a single software product or packaged into multiple software products.

Particular implementations of the subject matter have been described. Other implementations are within the scope of the following claims. For example, the actions recited in the claims can be performed in a different order and still achieve desirable results. As one example, the processes depicted in the accompanying figures do not necessarily require the particular order shown, or sequential order, to achieve desirable results. In some cases, multitasking and parallel processing may be advantageous.

What is claimed is:

1. A method comprising:
   (a) ingesting transportation-related data into a graph structure, the transportation-related data comprising flight-related data associated with a flight system comprising at least one drone;
   (b) identifying a flight-related transportation metric associated with the flight system, wherein the flight-related transportation metric comprises an energy consumption associated with the flight system;
   (c) identifying a plurality of attributes associated with the transportation-related data, wherein the flight-related transportation metric is dependent at least in part on the plurality of attributes and the plurality of attributes comprise i) a weight of the at least one drone and ii) a weight of a package carried by the at least one drone;
   (d) obtaining, from a quantum computer, values of one or more operational parameters for the plurality of attributes that improve the flight-related transportation metric; and
   (e) applying the values of the operational parameters to the operation of the flight system.

2. The method of claim 1, wherein the method further comprises:
   (a) measuring results of applying the values of the operational parameters to the operation of the flight system;
   (b) identifying an additional attribute associated with the flight data, wherein the flight-related transportation metric is also based at least in part on the additional attribute; and
   (c) obtaining, from a quantum computer, a value of an operational parameter for the additional attribute that improves the flight-related transportation metric.

3. The method of claim 1, wherein the quantum computer is a quantum annealer.

4. The method of claim 1, wherein the method further comprises using one or more of the values of the operational parameters for the plurality of attributes that improve the flight-related transportation metric for a first drone to improve the flight-related transportation metric for a second drone.

5. The method of claim 1, wherein identifying a plurality of attributes associated with the flight-related data further comprises identifying at least one constraint associated with the flight-related data.

6. The method of claim 1, wherein the method further comprises defining a data model prior to ingesting the flight-related data into a graph structure, the graph structure being based at least in part on the data model.

7. The method of claim 6, wherein the plurality of attributes further comprise i) wind speed and direction along potential flight paths for the at least one drone and ii) battery usage of on-board applications.

8. A system comprising:
   one or more computers and one or more storage devices on which are stored instructions that are operable, when executed by the one or more computers, to cause the one or more computers to perform operations comprising:
   (a) ingesting transportation-related data into a graph structure, the transportation-related data comprising flight-related data associated with a flight system comprising at least one drone;
   (b) identifying a flight-related transportation metric associated with the flight system, wherein the flight-related transportation metric comprises an energy consumption associated with the flight system;
   (c) identifying a plurality of attributes associated with the transportation-related data, wherein the flight-related transportation metric is dependent at least in part on the plurality of attributes and the plurality of attributes comprise i) a weight of the at least one drone and ii) a weight of a package carried by the at least one drone;
(d) obtaining, from a quantum computer, values of one or more operational parameters for the plurality of attributes that improve the flight-related transportation metric; and
(e) applying the values of the operational parameters to the operation of the flight system.

9. The system of claim 8, wherein the operations further comprise:
(a) measuring results of applying the values of the operational parameters to the operation of the flight system;
(b) identifying an additional attribute associated with the flight data, wherein the flight-related transportation metric is also based at least in part on the additional attribute; and
(c) obtaining, from a quantum computer, a value of an operational parameter for the additional attribute that improves the flight-related transportation metric.

10. The system of claim 8, wherein the quantum computer is a quantum annealer.

11. The system of claim 8, wherein the operations further comprise using one or more of the values of the operational parameters for the plurality of attributes that improve the flight-related transportation metric for a first drone to improve the flight-related transportation metric for a second drone.

12. The system of claim 8, wherein identifying at least one attribute associated with the flight-related data further comprises identifying at least one constraint associated with the flight-related data.

13. The system of claim 8, wherein the operations further comprise defining a data model prior to ingesting the flight-related data into a graph structure, the graph structure being based at least in part on the data model.

14. The system of claim 8, wherein the plurality of attributes further comprise one or more of i) wind speed and direction along potential flight paths for the at least one drone and ii) battery usage of on-board applications.

15. A method comprising:
(a) receiving transportation-related data, the transportation-related data comprising flight-related data associated with a flight system comprising at least one drone;
(b) identifying a flight-related transportation metric associated with the flight system, wherein the flight-related transportation metric comprises an energy consumption associated with the flight system;
(c) identifying a plurality of attributes associated with the transportation-related data, wherein the flight-related transportation metric is dependent at least in part on the plurality of attributes and the plurality of attributes comprise i) a weight of the at least one drone and ii) a weight of a package carried by the at least one drone;
(d) obtaining, from a quantum computer, values of one or more operational parameters for the plurality of attributes that improve the flight-related transportation metric; and
(e) applying the values of the operational parameters to the operation of the flight system.

16. The method of claim 15, wherein the method further comprises:
(a) measuring results of applying the values of the operational parameters to the operation of the flight system;
(b) identifying an additional attribute associated with the flight data, wherein the flight-related transportation metric is also based at least in part on the additional attribute; and
(c) obtaining, from a quantum computer, a value of an operational parameter for the additional attribute that improves the flight-related transportation metric.

17. The method of claim 15, wherein the plurality of attributes further comprise one or more of i) wind speed and direction along potential flight paths for the at least one drone and ii) battery usage of on-board applications.

* * * * *